June 26, 1951 W. D. WHITE 2,558,406

LINEAR MODULATION CIRCUIT

Filed Feb. 18, 1946

*INVENTOR*
WARREN D. WHITE

*BY*

William D. Hall

*ATTORNEY*

Patented June 26, 1951

2,558,406

UNITED STATES PATENT OFFICE 2,558,406

LINEAR MODULATION CIRCUIT

Warren D. White, West Hempstead, N. Y., assignor to the United States of America as represented by the Secretary of War Application February 18, 1946, Serial No. 648,538

4 Claims. (Cl. 332—37)

This invention relates generally to electrical circuits and more particularly to improvements in plate-modulated oscillators.

It is sometimes desirable to modulate the oscillator stage of a transmitter directly. The most common method of accomplishing this is by superimposing the modulating voltage upon the D.-C. plate supply voltage, resulting in so-called plate modulation. The linearity of such a plate modulated oscillator is ordinarily good only at relatively low modulating frequencies.

When high modulating frequencies are used in a plate modulated oscillator, for example, in a negative grid triode oscillator with tuned-plate tuned-grid circuits, the capacitance shunting the grid bias voltage tends to by-pass the rapid variations of bias voltage. This prevents the grid bias voltage from following closely the variation in plate voltage. As a result, the linearity of modulation is adversely affected. The high Q of the grid and plate resonant tank circuits also affect adversely the high frequency modulation, the result being similar to the effect of the shunting capacitance on the grid bias voltage.

It is, therefore, an object of this invention to provide means to compensate for the non-uniform action of the grid-bias shunting capacitance in vacuum tube circuits.

It is also an object of this invention to provide means to compensate for the effect of high-Q grid and plate tank circuits upon the modulation linearity of an oscillator.

Other objects, features, and advantages of this invention will suggest themselves to those skilled in the art and will become apparent from the following description of the invention taken in connection with the accompanying drawing in which.

It is to be understood that the very rapid variations of voltages and currents shown in Figs. 3 to 6 inclusive take place at the oscillation frequency, whereas the relative levels of D.-C. grid and plate voltages identified by the correspondingly designated horizontal lines in the said figures vary at the modulation frequency.

Figure 1:
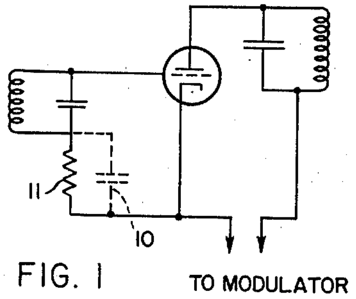
Fig. 1 is a diagram of a plate-modulated negative grid triode oscillator with tuned-plate tuned-grid circuits.

Referring now more particularly to Fig. 1, there is illustrated a common method of plate modulation in a negative grid triode oscillator. The capacitance 10, which includes the effective interelectrode and stray capacitances in the grid bias circuit, may be regarded as shunting the biasing resistance 11. When a modulating signal applied to the plate circuit is in the low or audio frequency range, the capacitance 10 does not prevent the grid from following the signal variations. This desired characteristic is illustrated by the graph in Fig. 5 where, as the D.-C. plate voltage is increased to twice the normal value shown in Fig. 3, the D.-C. grid voltage and plate current increase proportionally.

Figure 4:
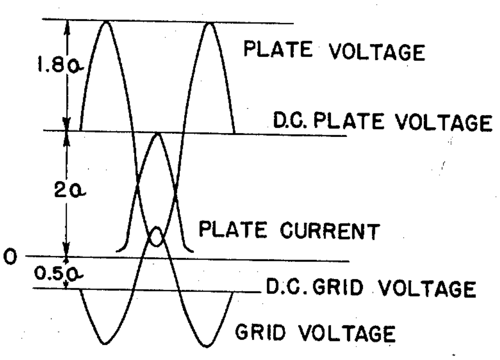
Fig. 4 is a graph illustrating the effects on grid and plate voltages and plate current, due to low reactance of capacitance across the grid bias, when the D.-C. plate voltage is rapidly increased.

However, as illustrated in Fig. 4, in which it may be assumed that the Q's of the tuned circuits are low, when high modulating frequencies are used the reactance of capacitance 10 becomes so low that the D.-C. grid bias voltage does not follow the modulation changes in plate voltage, and an excessive plate current results.

Figure 3:
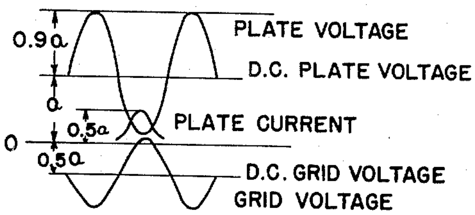
Fig. 3 is a graph showing the relation between A.-C. and D.-C. plate and grid voltages and plate currents in the circuits of Figs. 1 and 2 under normal carrier level conditions.
Figure 5:
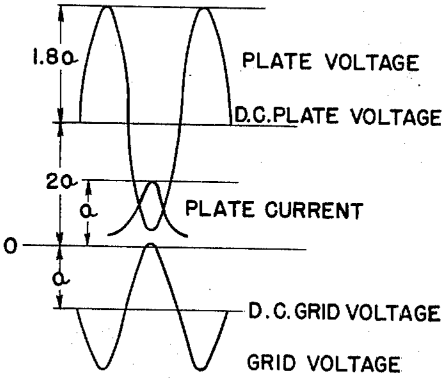
Fig. 5 is a graph illustrating the desired effects on grid and plate voltages and plate current as the D.-C. plate voltage is increased at any modulation frequency.
Figure 6:
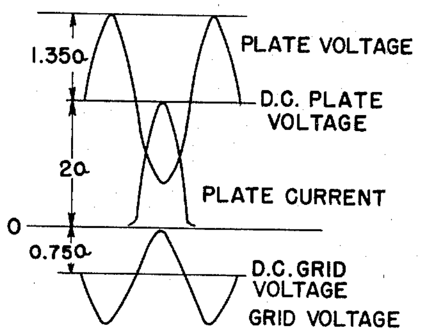
Fig. 6 is a graph illustrating the effects on grid and plate voltages and plate current, due to the high-Q of the tank circuit, when the D.-C. plate voltage is rapidly increased.

A comparison of Figs. 3 and 4 indicates that although the D.-C. plate voltage in Fig. 4 has been increased to substantially twice that in Fig. 3, the D.-C. grid voltage remains at the same value as in Fig. 3 and the plate current becomes excessive. Similarly, as illustrated in Fig. 6 in which it may be assumed that capacitance 10 is very small, while the D.-C. grid bias may to some extent follow the variation in the D.-C. plate voltage, the amplitudes of the grid and plate voltage swings are not as great as those shown for proper operating conditions as in Fig. 5, and again an excessive surge of plate current is produced.

Figure 2:
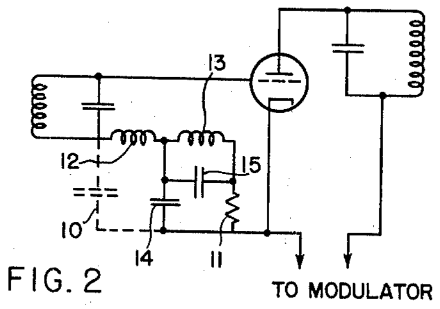
Fig. 2 is a diagram of a similar circuit embodying the invention.

In Fig. 2 a compensating network, comprising the inductances 12 and 13 and capacitances 14 and 15, has been included in the grid biasing circuit to compensate for the low impedance shunting effect of capacitance 10 at high frequencies. In operation, the reactive elements of the compensating network build up across the terminals of capacitance 10 a high impedance that is constant in magnitude as the modulation frequency varies. The capacitance 10, the inductance 12 and the capacitance 14 form a constant-*k* filter section. The constant-*k* filter section is matched to the grid biasing resistance 11 on an image impedance basis by an *m*-derived half section, comprising the capacitances 14 and 15 and inductance 13. If $X_{10}$ is the reactance of the total capacity (capacitance 10) across the filter input at the cutoff frequency ($f_c$) of the filter, then, on the assumption that there is a perfect impedance match of $R_{11}$ (resistance 11) to the filter, one has:

Magnitude of impedance =

$$R_{11}/\sqrt{1-[1-(R_{11}/2X_{10})^2](f/f_c)^2}$$

where $R_{11}$=load impedance with which the filter operates.

$X_{10}$=Reactance of total capacity across filter input terminals at the cutoff frequency $f_c$.

$f$=frequency of modulation.

For $X_{10}=R_{11}/2$, the impedance that is developed is constant up to the cutoff frequency $f_c$ of the low-pass filter, and has a value $2X_{10}^2$.

A network so designed to compensate for the reactance shunting effect of capacitance 10 at high frequencies is adequate in such circuits as video amplifiers. For a modulated oscillator circuit as here described, the additional effect of the high-Q circuits is corrected by overcompensating for the capacitance 10. This gives the desired operating characteristics as shown in Fig. 5.

While there has been described what is at present considered to be the preferred embodiment of this invention, it will be obvious to those skilled in the art that various changes and modifications may be made therein without departing from the scope of the invention as set forth in the appended claims.

What is claimed is:

1. A modulated vacuum tube tuned-plate, tuned-grid oscillator including, a grid biasing resistance, a first inductance connected to the tuned-grid circuit of said tube, a second inductance interconnecting said resistance and said first inductance, a first capacitance connected in shunt to said second inductance, a second capacitance connected across said serially connected resistance and second inductance, the interelectrode capacitance of said tube being considered as a third capacitance shunted across said serially connected resistance and inductances, the constants of said resistance, capacitances and inductances being interrelated to provide a substantially constant-impedance grid circuit whereby linear modulation may be obtained.

2. In a modulated vacuum tube oscillator having at least a cathode and a control grid, a grid to cathode circuit having a compensating network for improving the modulation linearity of said oscillator, said network including a constant-*k* filter circuit coupled to said grid, a grid biasing resistor connected to said cathode, and a terminating half section filter circuit connecting said resistor and said K filter circuit.

3. In combination, a vacuum tube having at least a cathode and a control grid, a grid biasing resistance connected to said cathode, a first inductance coupled to said grid, a second inductance interconnecting said resistance and said first inductance, a first capacitance connected in shunt with said second inductance, a second capacitance connected across said serially connected resistance and second inductance, the interelectrode capacitance of said tube being considered as a third capacitance shunted across said serially connected resistance and inductances, the constants of said resistance, capacitances and inductances being interrelated to at least compensate for said stray capacitance.

4. In combination, a vacuum tube having at least a cathode and a control grid, and a grid-to-cathode circuit including a network for compensating for the stray capacitance of said tube, said network comprising a constant-K filter circuit coupled to said grid, a grid bias resistor connected to said cathode, and an *m*-derived half section filter circuit connecting said resistor and said K filter circuit.

WARREN D. WHITE.

REFERENCES CITED

The following references are of record in the file of this patent:

"QST" for June 1934, page 14, published by American Radio Relay League.